United States Patent [19]

Shuknecht

[11] Patent Number: 5,750,171
[45] Date of Patent: May 12, 1998

[54] FINISH TOPPING MACHINE FOR BULB CROPS

[75] Inventor: Lee N. Shuknecht, Elba, N.Y.

[73] Assignee: Lee Shuknecht & Sons, Inc., Elba, N.Y.

[21] Appl. No.: 889,487

[22] Filed: Jul. 8, 1997

[51] Int. Cl.$^6$ .............................. A23N 7/00; A23N 15/00; A23N 15/02

[52] U.S. Cl. .............................. 426/481; 99/546; 99/635; 99/637; 99/640; 99/642; 99/643; 426/482; 426/484

[58] Field of Search .............................. 99/516, 534, 546, 99/635–643; 426/481–484

[56] References Cited

U.S. PATENT DOCUMENTS

| | | |
|---|---|---|
| 2,414,922 | 1/1947 | Barrett et al. |
| 3,764,717 | 10/1973 | Rood .............................. 426/481 |
| 4,068,011 | 1/1978 | Green et al. .............................. 426/482 |
| 4,258,618 | 3/1981 | Lawson. |
| 4,430,933 | 2/1984 | Boots .............................. 99/637 |
| 4,457,224 | 7/1984 | Kino .............................. 426/482 |
| 4,569,850 | 2/1986 | Harris et al. .............................. 426/511 X |
| 4,602,559 | 7/1986 | Suzuki et al. |
| 4,718,334 | 1/1988 | Nagaoka. |
| 4,889,045 | 12/1989 | Backus. |
| 4,998,466 | 3/1991 | Nagaoka .............................. 99/537 X |
| 4,998,468 | 3/1991 | Nagaoka .............................. 99/636 |
| 5,000,087 | 3/1991 | Nagaoka. |
| 5,066,507 | 11/1991 | Miwa et al. .............................. 426/481 |
| 5,158,011 | 10/1992 | Chen .............................. 99/516 X |
| 5,170,698 | 12/1992 | Kirk .............................. 99/516 X |
| 5,231,921 | 8/1993 | Kirk .............................. 99/537 |
| 5,431,000 | 7/1995 | Shuknecht .............................. 56/308 |
| 5,476,037 | 12/1995 | Nagaoka .............................. 99/584 |
| 5,495,797 | 3/1996 | Meulnart. |

Primary Examiner—Timothy F. Simone
Attorney, Agent, or Firm—M. Lukacher; R. C. Brown

[57] ABSTRACT

A finish topper for bulb crops having a plurality of longitudinal, parallel, generally horizontal, spaced-apart moving belts for conveying bulbs through the apparatus. Adjacent belts are driven at different linear speeds. In a preferred embodiment, alternate belts are replaced by stationary rails to maximize the speed differential. Below and adjustably close to the belts is a driven rotating blade for cutting the bulb stems and also exerting a downwards draft of air through the belts. Onions introduced onto the belts are conveyed through the apparatus by the belts, and the differential in speed between the moving belts and stationary rails causes the bulbs to rotate and gyrate randomly as they are being conveyed. Because the belts are spaced apart, the bulbs assume momentarily an attitude to permit the uncut stems of bulbs to extend downwardly between the belts. The bulbs are retained on their shoulders on the belts in inverted posture. Each bulb, in its random rotational movements, assumes this attitude at least once, at which time the stem is immediately sheared to the proper residual length by the rotating blade. When the belts are covered by a flexible blanket the random gyrations of the onions is increased. Since each onion is restrained by its shoulders against the belts, the residual stem of every onion is equal in length as measured from the onion shoulder.

22 Claims, 4 Drawing Sheets

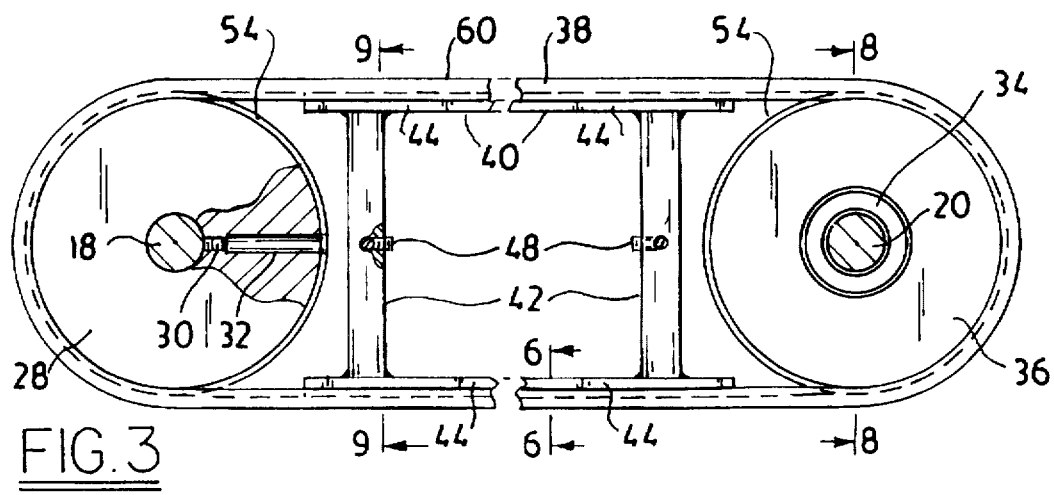
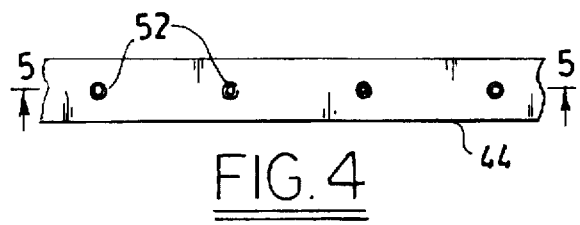
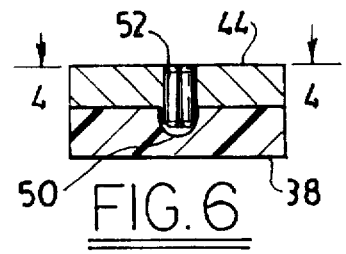
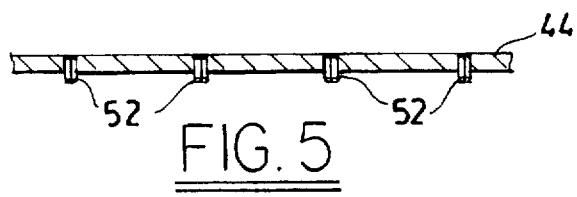
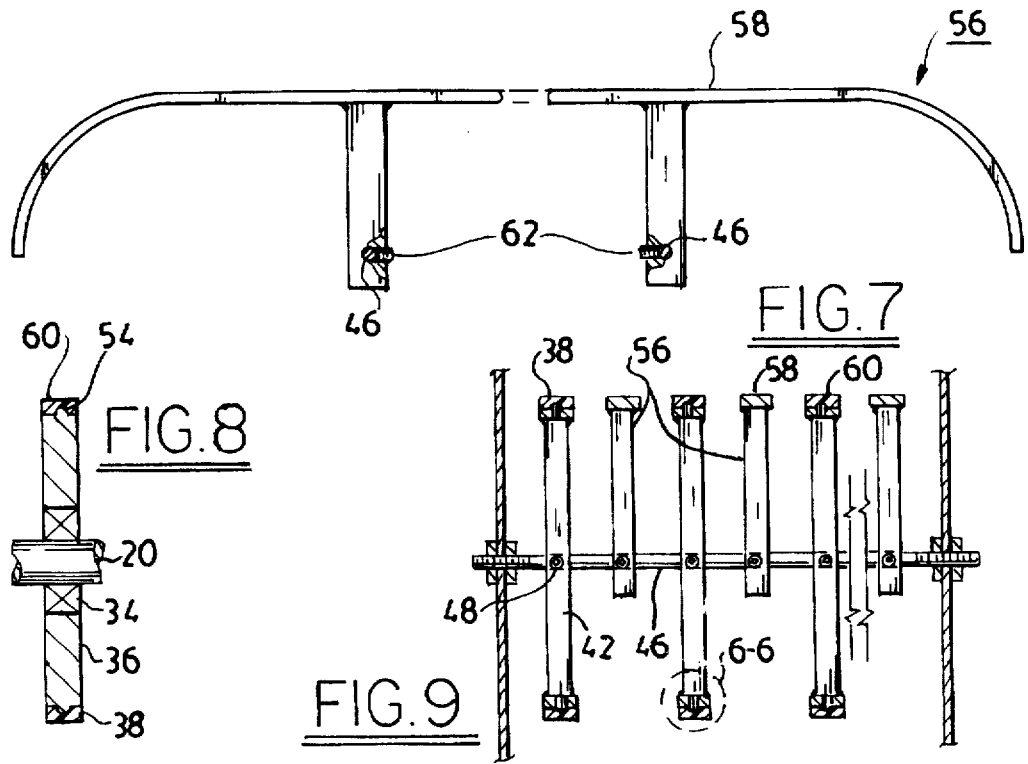

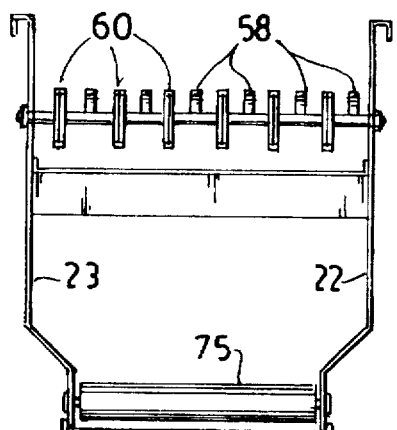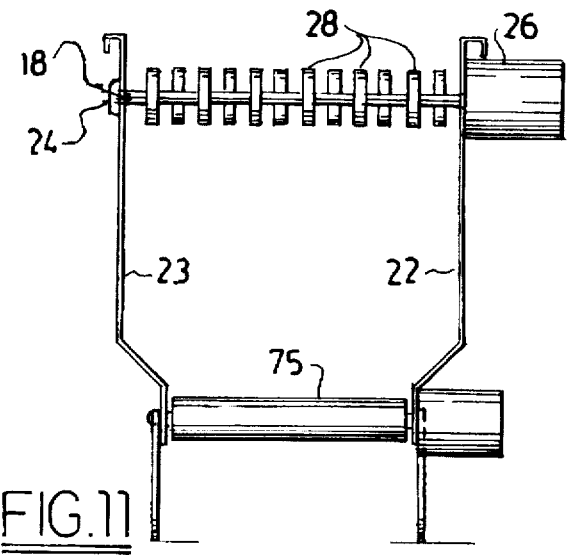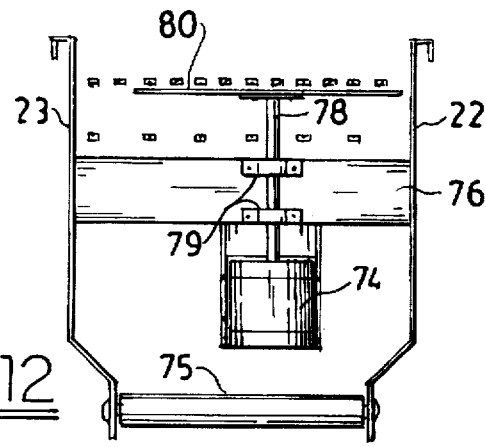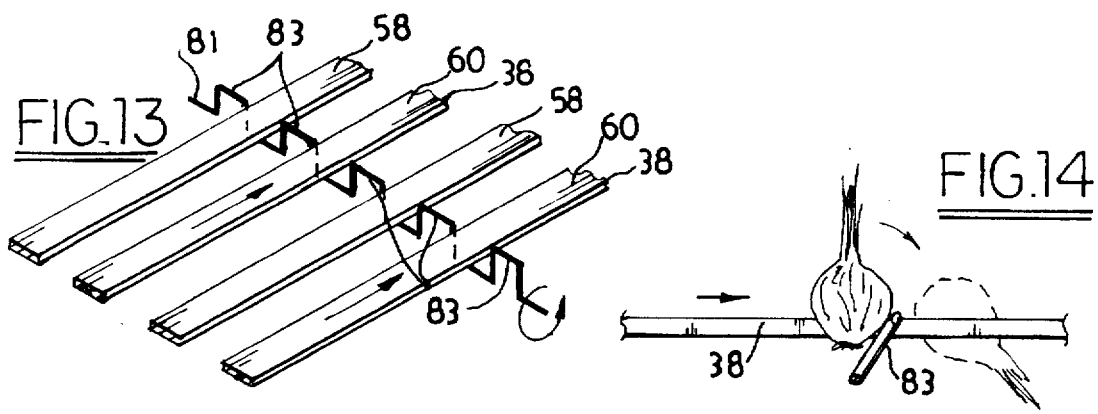

FINISH TOPPING MACHINE FOR BULB CROPS

DESCRIPTION

The present invention relates to methods and apparatus for removing a portion of the tops, or stems and roots, from bulb crops such as onions, shallots, beets, garlic, radishes, and turnips, and more particularly to apparatus for finish topping of such bulbs. For ease of discussion herein, all such bulb crops are referred to as "onions." By "finish topping" is meant the removal of an additional portion of the plant top to leave a desirably short length of top attached to the bulb. The roots may also be removed by finish topping.

It may be desirable to remove most of the top growth and roots from each bulb before sale. Typically, stems are preliminarily cut by a harvesting machine in the field to a length of between about 2 and 4 inches, and may also be finish topped by a second apparatus in a factory packing operation to the USDA No. 1 Pack standard of 1.5 inches. Even shorter stems of 1 inch or less are highly desirable for many consumers, particularly of onions for direct retail sale. Although bulbs may be of varying size within a given harvest, it is further desirable that the stems of all bulbs be cut to a uniform length from the shoulder of the bulbs.

In many geographical regions, for example, in the southern United States, onions typically are harvested for human consumption when the above-ground portion of the plants are still succulent. This presents a particular problem in that topping apparatus can rapidly become fouled with sticky onion juice which can cause the machine to jam and also can leave an undesirable stain or residue on succeeding bulbs.

Numerous schemes have been proposed in the onion harvesting and processing art for trimming stems and/or roots.

U.S. Pat. No. 2,414,922 issued Jan. 28, 1947 to Barrett et al. discloses an onion topping device, known as a roller topper, with a topping bed having a plurality of longitudinal spiral-wound rolls, each of which rotates against a parallel stationary cutter blade. When onions are fed onto the bed, the stems and roots are entrained between the spirals and the cutters and are sheared off, much in the fashion of a reel lawnmower. A disadvantage of a roller topper is that onions differing in size and shape will have cut stems of differing lengths. An additional disadvantage we have found is that although the spiral rolls and the cutters may trim dried onions cleanly, when presented with succulent onion stems the rolls and cutters can rapidly become wet with juice and pulp and can leave unacceptable stains and residues on the bulbs.

U.S. Pat. No. 2,978,333 issued Apr. 4, 1961 to Teigen discloses an apparatus having a vacuum box above a conveyor, the vacuum box being open towards the conveyor and having a rotary knife therein. As upright conveyed onions pass the vacuum box, the stems are drawn into the box and are severed by the knife. Since the spacing between the conveyor and the box is invariant, the spacing of the knife is referenced only to the bottom of the bulb, not to its shoulder, and hence onions of different heights will be cut undesirably to different lengths of residual stem.

U.S. Pat. No. 5,431,000 issued Jul. 11, 1995 to Shuknecht et al. discloses a sickle-bar topper disposed within a forced-air onion harvesting machine wherein whole onions being conveyed horizontally on a chain-link belt are exposed to a forced air draft from below which lifts the stems upwards into engagement with a horizontal sickle-bar cutter. As in the Teigen apparatus, the spacing of the cutter is referenced to the bottom of the bulb (the conveyor), and thus stems of varying lengths from the shoulder are left on the bulbs. Further, if the spacing is set to provide short residual stems on smaller bulbs, the cutter may be low enough to cut into and ruin larger bulbs.

It is a principal object of the invention to provide an improved apparatus for finish topping of bulb crops wherein the plane of a topping cutter, and hence the length of each residual stem, is referenced from the shoulder of each individual bulb.

It is a further object of the invention to provide an improved apparatus for finish topping of bulb crops wherein the length of each residual stem as measured from the shoulder of the bulb is substantially identical.

It is a still further object of the invention to provide an improved apparatus for finish topping of bulb crops wherein bulbs are not bruised, punctured, or stained by passage through the apparatus.

Briefly described, a finish topper machine embodying the invention comprises a plurality of longitudinal, parallel, generally horizontal, endless moving belts having spaces therebetween, referred to herein as a "belt section," the belts being disposed between upwardly extending side walls which form thereby a conveyance channel for onions on the belts. Adjacent of the belts are driven at different linear speeds. In a preferred embodiment, alternate belts are either reduced to zero speed or are replaced by stationary rails to maximize the speed differential. Below and adjustably close to the belts is a cutting means, preferably a driven rotating blade similar to a rotary lawnmower blade, rotatable about a generally vertical axis and in a direction to exert a downwards draft of air through the belts. Onions introduced onto the belts are conveyed through the apparatus by the belts, and the differential speed of adjacent belts causes the bulbs to rotate and gyrate randomly as they are being conveyed. The spacing of the belts is set to permit the attached stems of bulbs to extend downwardly between adjacent belts. The bulb itself is retained on its shoulders, on the upper surface of the belts, in inverted posture. During passage through the machine, each bulb in its random rotational movements assumes this attitude at least once, at which time the stem is immediately sheared by the cutting means to the proper residual length. The cut waste falls to a conveyor below the cutting means and is removed from the apparatus. Since each onion is restrained by its shoulders against the belts, the residual stem of every onion is equal in length as measured from the onion shoulder.

To accommodate a desired throughput load and velocity, an apparatus in accordance with the invention may comprise a plurality of belt sections similar to that just described, each section depositing onions onto a succeeding belt section and ultimately into a receptacle for further processing. A typical machine may include, preferably, four such sections. It may additionally comprise a first pre-sizing section, without cutting means, wherein the belts may be spaced apart preferably slightly farther than the belts in the topping sections to permit undersize onions to fall between the belts to be otherwise used or discarded.

In a further embodiment, one or more of the belt sections may be covered by a flexible blanket extending substantially full-width of the section between the side walls, the onions passing between the blanket and the belts. The down-pumping of the cutting blade below the belts creates a partial vacuum in the onion region which draws the blanket against the onions to increase the random gyrations of the onions.

In a still further embodiment, the apparatus may be variably elevatable at its downstream end to cause the onions to "run uphill." This feature is useful in establishing experimentally, and then setting, the optimum residence time for any particular batch of onions in the apparatus, balancing completeness of topping with throughput speed and productivity.

The foregoing and other objects, features, and advantages of the invention, as well as presently preferred embodiments thereof, will become more apparent from a reading of the following description in connection with the accompanying drawings in which:

FIG. 3 is a detailed elevational view, partially in cross-section, of an individual belt and associated conveyance structure;

FIG. 4 is a plan view of a portion of the conveyance structure shown in FIG. 3;

FIG. 5 is an elevational cross-sectional view of the portion of the conveyance structure shown in FIG. 4, taken along line 5—5 therein;

FIG. 6 is an elevational cross-sectional view of a portion of the belt and conveyance structure shown in FIG. 3, taken along line 6—6 in FIG. 3 and enlarged from circle 6—6 in FIG. 7;

FIG. 7 is an elevational view of a stationary inter-belt rail;

FIG. 8 is a cross-sectional view of a belt pulley mounted on a pulley drive shaft;

FIG. 9 is an elevational view, partially in cross-section, taken along line 9—9 in FIG. 3;

FIG. 10 is an elevational view near the downstream end of the apparatus, taken along line 10—10 in FIG. 2;

FIG. 11 is an elevational view of the upstream end of the apparatus, taken along line 11—11 in FIG. 2;

FIG. 12 is a cross-sectional view of the apparatus, taken along line 12—12 in FIG. 2;

FIG. 13 is an isometric view from above, showing placement of a tipper bar in the onion path between the belts; and FIG. 14 is an elevational view, partially in cross-section, showing an onion being tipped over by the tipper bar shown in FIG. 13.

Figure 1:
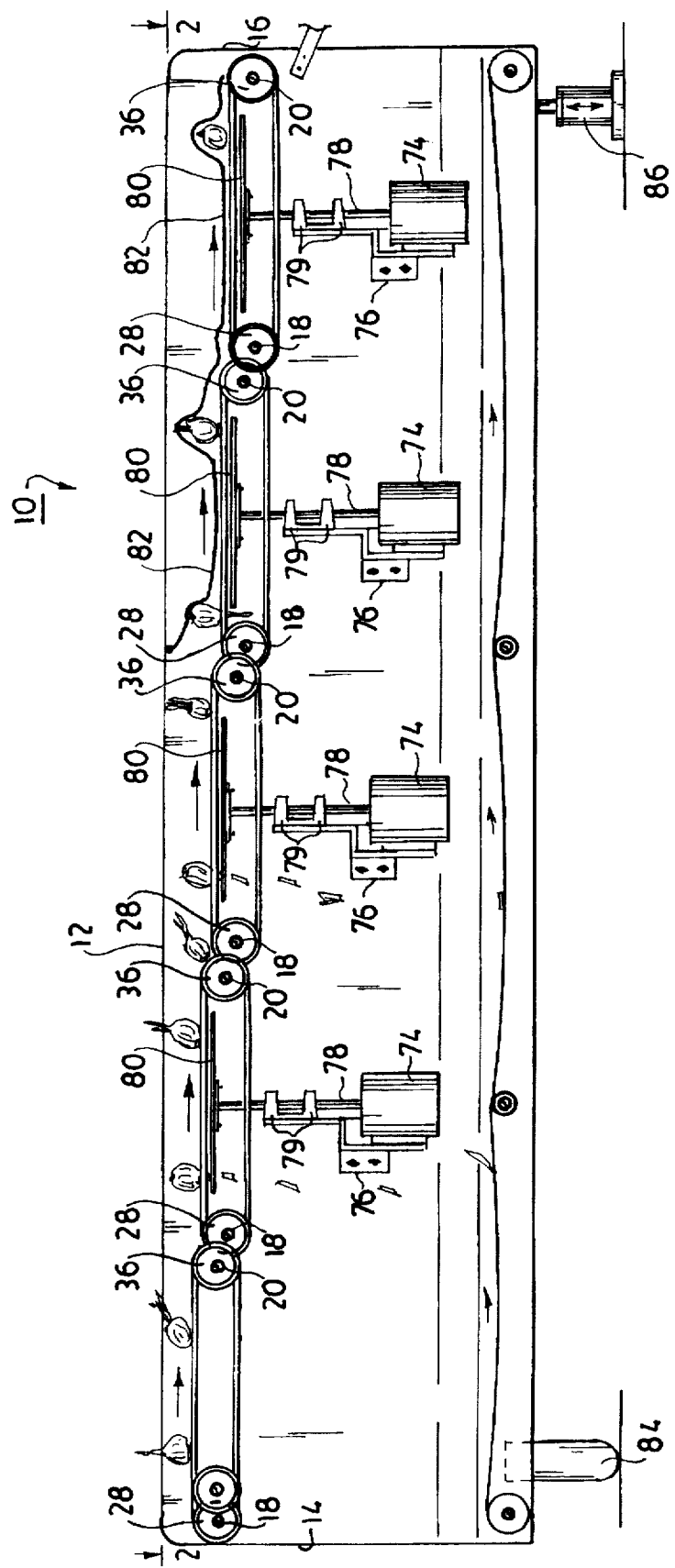
FIG. 1 is a side elevational view of a finish topping apparatus in accordance with the invention, taken along line 1—1 in FIG. 2.
Figure 2:
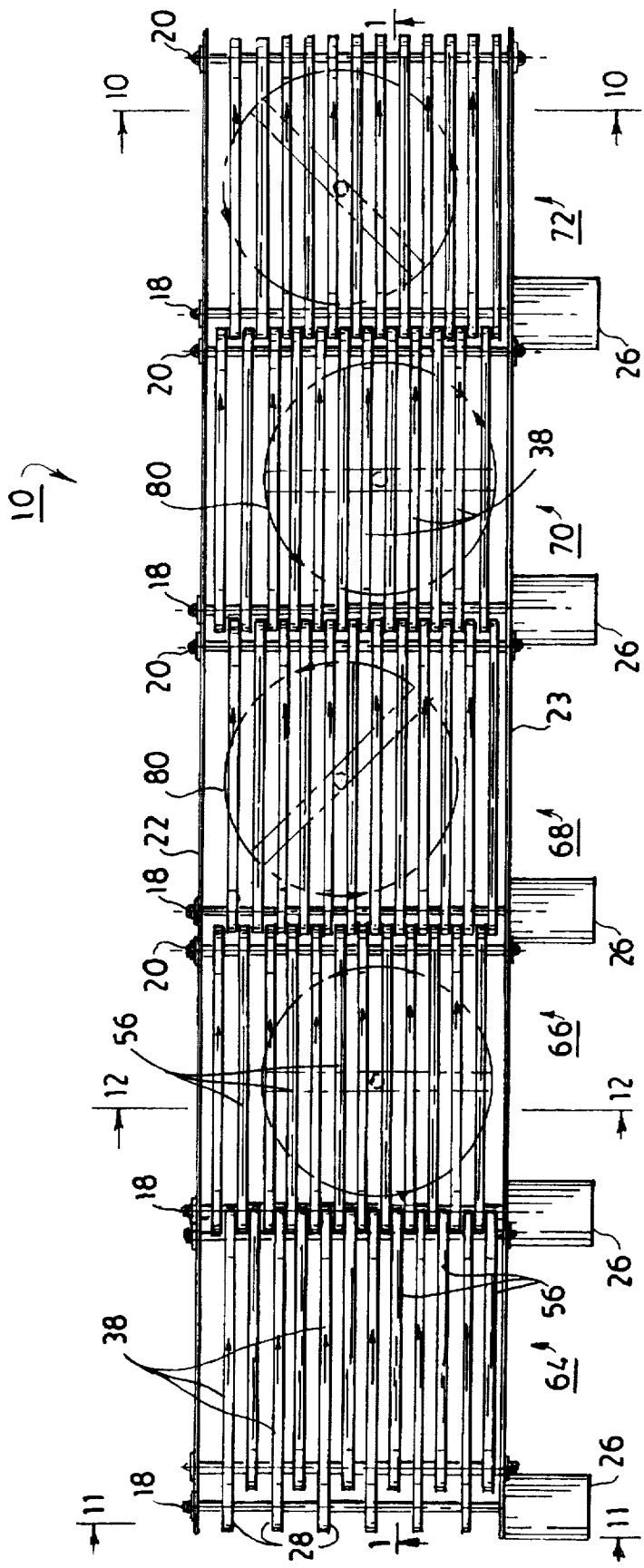
FIG. 2 is a plan view of the apparatus shown in FIG. 1, taken along line 2—2 therein.

Referring to FIGS. 1 through 14, there is shown a bulb topping apparatus 10 in accordance with the invention. A generally trough-shaped longitudinal frame 12 having an upstream, or feed, end 14 and a downstream, or discharge, end 16 supports a plurality of pairs of transverse drive shafts 18 and idler shafts 20 which are mounted through appropriate holes in opposed sidewalls 22 and 23 of frame 12. Drive shafts 18 are rotatably supported by bearings 24 mounted on sidewall 22 and are driven by electric motors 26 mounted on opposing sidewall 23. Preferably, the rotational drive speed of the motors, and hence of the drive shafts, may be controllably varied by any conventional motor drive control scheme (not shown). Shafts 18 may be individually driven as shown in FIGS. 2 and 11, or they may be driven, for example, from a single larger motor by a conventional arrangement of pulleys and belts, sprockets and chains, gears, or other suitable drive means (not shown). Idler shafts 20 are non-rotatably supported and fixed as by threaded fasteners to frame 12.

Supported on drive shafts 18 are a plurality of drive pulleys 28 axially spaced apart along drive shafts 18. Each one of pulleys 28 may be fixed to rotate with drive shaft 18 at any desired axial location by means of set screw 30 threadedly disposed in well 32. Alternatively, pulleys 28 may be otherwise fixed to rotate with shaft 18, for example, by making the shaft and the pulley bore polygonal in cross section, or by threading the shaft and providing locking nuts on either side of each pulley (not shown).

Supported in bearings 34 on idler shafts 20 are a plurality of idler pulleys 36 axially spaced apart along idler shafts 20. The bearings of each idler pulley 36 may be fixed at any desired axial location by means similar to those just described for the drive pulleys.

The planes of rotation of all the driven pulleys and all the idler pulleys are parallel. For each driven pulley there is a coplanar idler pulley, each pair of such pulleys defining a conveyance path for an endless belt 38. Between the pulleys, each belt 38 is supported and guided by a guide frame 40 having struts 42 and belt guides 44, and including a plane which is coplanar with the plane of the pulleys. Each guide frame 40 is supported through bores therein on mounting rods 46 attached to sidewalls 22,23, and may be fixed on rods 46 to be coplanar with the pulleys by set screws 48. Preferably, belt 38 is provided on its inner surface with a groove 50 which is receivable of guide pins 52 in belt guides 44 and a radial flange 54 in each of pulleys 28,36. The guide pins and pulley flanges serve to retain the belts in place and to keep the belt groove free of debris during topping operation of the apparatus. In the latter respect, this arrangement is superior to other, more conventional configurations which might be selected, such as V-belts in V-pulleys. Belts 38 may be molded or otherwise formed from any suitable durable, flexible material such as a polymer, and in a currently preferred embodiment are formed by heat welding of appropriate lengths of linear stock cut from continuous polyurethane belting. The combination of belts 38, pulleys 28,36, and guide frames 40 defines a first conveyance assembly of the apparatus, belts 38 being drivable at a first linear velocity.

In a preferred embodiment, between adjacent belts 38 is a stationary rail 56, the outer surface 58 of which is substantially coplanar with the outer surface 60 of belts 38 over approximately half the length of belt 38, as shown in FIG. 7. In assembly, rails 56 are alternated with guide frames 40 on mounting rods 46. Each rail 56 may be fixed on rods 46 by set screw 62, preferably to be equidistant from the adjacent guide frames and belts. Rails 56 may be smooth on their upper surfaces as shown in FIG. 7, or one or more rails may be provided with a central, longitudinal ridge formable as by welding of rod stock onto the upper surface thereof. The ridge may be coated or covered with a polymeric sleeve if desired. Rail 56 defines an embodiment of a second conveyance assembly of the apparatus.

Preferably, the transverse spacing between each belt and its adjacent rails is the same for all belts and rails and is less than the diameter of the onions being topped, so that each onion rests partly on a belt and partly on a rail, bridging the gap therebetween. The spacing between belts and rails may be easily varied by varying the positions of the pulleys 28,36 on the shafts 18,20 and the guide frames 40 and rails 56 on rods 46. For example, we have found that to obtain a 1 inch residual stem on an average onion from the northeast U.S. may require a belt-to-rail spacing of about 1.5 inches, whereas northwest U.S. and California onions, being somewhat larger on average, may require a spacing approaching 2 inches. These spacings may be varied for any particular crop of onions as desired by varying the pulley, guide, and rail positions as described hereinabove.

In an alternative embodiment, rails 56 may be replaced with a second set of belts, being interleaved with belts 38, and a second set of guide frames 40 to define another embodiment of a second conveyance assembly of the apparatus. Idler shafts 20 are replaced by driven shafts, bearings, and motors, like shaft 18, bearings 24, and motors 26. In addition, on each shaft, idler pulleys are alternated with drive pulleys. Preferably, the second set of shafts and belts may be driven at a second linear belt velocity substantially different from the linear velocity of the first set of belts, or even in the opposite direction, to impart rotation and gyration to bulbs being conveyed.

Each assembly of driven and idler pulleys and belts supported by a pair of shafts defines a belt section. Bulb topper 10 comprises five such belt sections, 64, 66, 68, 70, and 72, sequentially and respectively.

In first belt section 64, the pulleys, guide frames, and rails are spaced along the driven and idler shafts to provide desired gaps between adjacent belts and rails. Section 64 functions as a presorter, and the width of these gaps is set to permit all unacceptably small bulbs introduced into the apparatus to fall through and be collected for other processing or discard. All bulbs larger in diameter than this width are passed on to the remainder of the machine. Section 64 has no topping capability.

All subsequent belt sections are substantially identical and have topping capability. As shown in FIGS. 1 and 12, each section is provided with a cutter motor 74 mounted on a bracket 76 extending between sidewalls 22 and 23. Bracket 76 preferably is bolted to the sidewalls through slotted holes to permit adjustment of the vertical position of bracket 74. Extending upwards from motor 74 orthogonal to upper rail surface 58 is motor shaft extension 78 which is constrained on bracket 76 by bearings 79 and which is provided at its upper end with a rotary blade 80 similar to the blade of a rotary lawnmower. For example, blade 80 may be a 27 inches long and motor 74 may be a 3 HP direct drive motor operative at 1760 rpm. Preferably, the width of the belt section between sidewalls 22 and 23, the length of the section between the pulleys, and the placement of struts 42 in frames 40, and the length of blade 80 are all selected so that the rotational path of blade 80 extends the full width of its belt section. Preferably, blade 80 is sharpened along the entire length of its leading rotational edge, to maximize the area of cutting opportunity, and is twisted downwards at its trailing edge so that blade 80 is both a cutter and a down-pumping fan blade.

Any desired length of residual stem on a finish-topped onion may be obtained by setting the vertical position of bracket 76 in the slotted holes in the sidewalls such that the cutting edge of blade 80 is the desired distance below the upper surface 60 of belts 38.

Disposed below the cutter drive motors 74 within trough frame 12 is a conventional conveyor 75 for receiving the cut stems and transporting them out of the apparatus.

The upper surfaces of the belts and rails in each belt section define a conveyance plane for that section. Preferably, the conveyance plane for each succeeding section is lower than that of the preceding section, as shown clearly in FIG. 1, preferably by about one-third the diameter of the pulleys. Also, the drive pulleys 28 of each section are staggered from, and interleaved with, the idler pulleys 36 of the preceding section. This configuration allows smooth flow of onions from one section to the next and prevents onions from becoming dynamically trapped in a nip between sections. Also the drop tends to rotate the onions forwardly so as to assist the belts to orient the onions in an inverted position for topping.

Apparatus in accordance with the invention may be provided with an onion tipper bar 81 to assist in rotating the onions, as shown in FIGS. 13 and 14. Tipper bar 81 preferably is disposed below and transverse of belts 38 and is formed in a series of square bights 83 extending upwards between the belts and rails. Bar 81 is supported by sidewalls 22,23, and preferably is rotatable to vary the attitude of the bights to onions being conveyed by the belts. In operation, an onion encountering a bight 83 may be tipped from upright to inverted position for topping as shown in FIG. 14.

The gyrating action of onions moving through topping apparatus 10 also can be enhanced by addition of a flexible blanket 82 to one or more of the topping sections. As shown in FIG. 1, for example, blanket 82 is suspended at its forward edge on a rigid mounting bar extending between the sidewalls above the entrance to section 70. Blanket 82 may be formed of any convenient flexible material, preferably of rubber sheeting about 100 mils in thickness, and extends substantially the full width and length of the belt section between the sidewalls. Because of the partial vacuum produced by the down-pumping action of blade 80, blanket 82 is drawn downwards against the onions passing between blanket 82 and belts 38, increasing the force of the onions against the belts and preventing the onions from bouncing and becoming bruised. Since the blanket is stationary and the belts are moving, the onions are caused to rotate about a horizontal axis transverse of the direction of onion travel. Simultaneously, of course, the speed differential between the belts and rails, or between two sets of interleaved belts, causes the onions to rotate about a vertical axis transverse of the direction of onion travel. The combination of these two simultaneous rotary motions of results in a very vigorous, random gyration of each bulb in which each bulb can assume for a moment the desired inverted posture for topping at least several times during a single passage through the topping apparatus.

Preferably, bulb topping apparatus 10 is vertically pivotable on foot 84 and is variably tiltable by lift 86, which may include a hydraulic or pneumatic cylinder or other jacking arrangement. Via lift 86, the angle of the conveyance planes may be varied to vary the speed with which onions pass through the apparatus. Raising lift 86 to force the onions to travel up a gradient extends the residence time and hence increases the opportunity for topping, but also reduces the throughput volume of the machine. Optimum conditions may be easily achieved experimentally for each batch of onions by varying the speed of the controllably-variable belt drive motors 26 and the elevation of lift 86.

From the foregoing description it will be apparent that there has been provided an improved apparatus for finish topping of bulb crops, wherein the length of residual top is controlled by reference to the shoulder of each bulb, and wherein the length of residual top is the same for each bulb, and wherein tops may be trimmed to a desirably short length without damaging or staining of the bulbs. Variations and modifications of the herein described finish topper, in accordance with the invention, will undoubtedly suggest themselves to those skilled in this art. Accordingly, the foregoing description should be taken as illustrative and not in a limiting sense.

What is claimed is:

1. A machine for shearing a portion of the stems from the bulbs of bulbous root crops to leave a residual stem on each bulb, comprising:

a) a frame;

b) a first bulb conveyance assembly supported by said frame and including at least one belt disposed for longitudinal motion along said frame at a first linear velocity to convey bulbs on an upper surface thereof;

c) a second bulb conveyance assembly having an upper surface and being supported by said frame and disposed along said frame in parallel and off-spaced relationship to said first conveyance assembly, there being a velocity difference in operation between said first assembly conveyance belt and second conveyance assembly, said space therebetween being less than the diameter of said bulb, said first and second conveyance assemblies being cooperable to convey bulbs through said apparatus; and d) at least one driven blade disposed in a plane at a distance below said upper surfaces of said first and second conveyance assemblies for shearing the stems of bulbs extending downwards between said first and second conveyance assemblies and through said plane.

2. The machine in accordance with claim 1 wherein said first conveyance assembly further comprises a plurality of parallel, spaced-apart belts.

3. The machine in accordance with claim 2 wherein said apparatus further includes a drive shaft mounted for rotation on said frame, a motor for rotatably driving said drive shaft, and an idler shaft rigidly mounted on said frame, said first conveyance assembly further comprising for each of said belts, a drive pulley drivingly disposed on said drive shaft, an idler pulley disposed on said idler shaft, and a belt guide frame disposed between said drive pulley and said idler pulley.

4. The machine in accordance with claim 3 wherein each of said drive and idler pulleys is provided with a circumferential radial flange, each of said belt guides is provided with a plurality of pins extending into the path of said belt, and each of said belts is provided with a mating groove in the inner surface thereof for retaining said belts on said pulleys and said guide frames.

5. The machine in accordance with claim 1 wherein said second conveyance assembly comprises at least one belt.

6. The machine in accordance with claim 2 wherein said second conveyance assembly comprises a plurality of parallel, spaced-apart belts, and wherein said belts of said second conveyance assembly may be driven at a second linear velocity different from said first linear velocity, said velocity difference being established thereby.

7. The machine in accordance with claim 1 wherein said second conveyance assembly comprises at least one stationary rail.

8. The machine in accordance with claim 1 wherein said second conveyance assembly comprises a plurality of parallel, spaced-apart rails, said rails being stationary and said velocity difference being established thereby.

9. The machine in accordance with claim 1 wherein said belts and rails are alternatingly arranged in the transverse direction of said machine.

10. The machine in accordance with claim 9 wherein each rail is disposed equidistant from adjacent belts, and each belt is disposed equidistant from adjacent rails.

11. The machine in accordance with claim 10 further comprising a tipper bar having bights disposed between said adjacent belts and rails.

12. The machine in accordance with claim 1 wherein said frame, said first conveyance assembly, said second conveyance assembly, and said driven blade define a belt section.

13. The machine in accordance with claim 12 wherein said apparatus comprises a plurality of belt sections.

14. The machine in accordance with claim 13 further comprising a pre-sizing section upstream of said belt sections.

15. The machine in accordance with claim 13 wherein each of said sections is lower than the immediately preceding section.

16. The machine in accordance with claim 13 wherein a portion of the first and second conveyance assemblies of any one belt section are interleaved with a portion of the first and second conveyance assemblies of an adjacent belt section.

17. The machine in accordance with claim 1 further comprising a flexible blanket disposed above the upper surfaces of said first and second conveyance assemblies.

18. The machine in accordance with claim 1 further comprising a pivotable foot supporting a first end of said frame and a lift supporting a second end of said frame.

19. The machine in accordance with claim 1 wherein said blade is drivingly connected to an electric motor.

20. The machine in accordance with claim 1 wherein said blade is a rotary blade, is sharpened over substantially all of its rotational leading edge, and is twisted downwards along a portion of its trailing edge.

21. The machine in accordance with claim 1 wherein said distance between said upper surfaces of said first and second conveyance assemblies and said blade may be varied to vary the length of said stem residual on said bulbs.

22. A method for shearing a portion of the stem from the bulb of a bulbous root crop to leave a residual stem on the bulb, comprising the steps of:

a) providing a first conveyance assembly including a drivable belt having an upper surface;

b) providing a second conveyance assembly spaced apart from and substantially parallel to said first conveyance assembly and having an upper surface substantially coplanar with said belt upper surface;

c) providing a cutting blade at a distance below said assembly upper surfaces corresponding to the desired length of said residual stem;

d) placing said bulb on said first and second conveyance assemblies so that said bulb touches a portion of each of said upper surfaces;

e) driving said belt past said second conveyance assembly to create a velocity difference therebetween for gyrating said bulb to an inverted position wherein said stem extends downwards between said first and second conveyance assemblies to engage said blade; and f) driving said blade to sever said stem to leave said desired length of stem residual with said bulb.

* * * * *